(12) United States Patent     (10) Patent No.:   US 12,624,590 B2

Zhao et al.     (45) Date of Patent:    May 12, 2026

(54) DEVICE FOR SEPARATELY ARRANGING VACUUM GLASS SUPPORTS AND METHOD THEREOF

(71) Applicant: LUOYANG LANDGLASS TECHNOLOGY CO., LTD., Luoyang (CN)

(72) Inventors: Yan Zhao, Luoyang (CN); Zhangsheng Wang, Luoyang (CN); Jinyu Li, Luoyang (CN); Haiyan Wu, Luoyang (CN)

(73) Assignee: LUOYANG LANDVAC Ti-VIG CO., LTD., Luoyang (CN)

( * ) Notice: Subject to any disclaimer, the term of this patent is extended or adjusted under 35 U.S.C. 154(b) by 624 days.

(21) Appl. No.: 17/918,174

(22) PCT Filed: Mar. 4, 2021

(86) PCT No.: PCT/CN2021/079067
§ 371 (c)(1),
(2) Date: Oct. 11, 2022

(87) PCT Pub. No.: WO2021/208628
PCT Pub. Date: Oct. 21, 2021

(65) Prior Publication Data
US 2024/0052689 A1   Feb. 15, 2024

(30) Foreign Application Priority Data
Apr. 13, 2020   (CN) ......................... 202010284983.1

(51) Int. Cl.
   *E06B 3/673*     (2006.01)
   *B23P 19/00*    (2006.01)
   *E06B 3/663*     (2006.01)

(52) U.S. Cl.
CPC ........ *E06B 3/67326* (2013.01); *B23P 19/001* (2013.01); *E06B 3/66304* (2013.01)

(58) Field of Classification Search
CPC .... B23P 19/001; B65B 35/06; E06B 3/66304; E06B 3/67326
See application file for complete search history.

(56) References Cited

U.S. PATENT DOCUMENTS

| 2,429,891 | A | * | 10/1947 | Neff | ........................... B07C 5/08 |
| | | | | | 361/170 |
| 2,953,959 | A | * | 9/1960 | Weinert | .............. F42B 33/0292 |
| | | | | | 141/73 |

(Continued)

FOREIGN PATENT DOCUMENTS

| CN | 101698565 A | 4/2010 |
| CN | 203668211 U | 6/2014 |

(Continued)

OTHER PUBLICATIONS

International Search Report issued in corresponding International Patent Application No. PCT/CN2021/079067 dated Jun. 1, 2021.

*Primary Examiner* — Gene O Crawford
*Assistant Examiner* — Kelvin L Randall, Jr.
(74) *Attorney, Agent, or Firm* — DLA PIPER LLP (US); Blake W. Jackson; Thomas J. Fuller

(57) ABSTRACT

The present disclosure provides a device for separately arranging vacuum glass supports, which comprises a base, a vibrator, a separation chamber assembly, a separation actuator, a feed tube, and a drive device. The separation chamber assembly is provided with a feed inlet, an accommodation cavity, and a dispensing outlet. The feed inlet is communicated with the accommodation cavity. The dispensing outlet is communicated with the feed tube. The separation actuator is arranged directly below the accommodation cavity and capable to move reciprocatingly with respect to the accom- (Continued)

modation cavity. A recess capable of accommodating one support is provided at the upper edge of the separation actuator. Thus, at each reciprocating movement, the separation actuator transports one support from the accommodation cavity to the dispensing outlet via the recess, which avoid arranging multiple supports in one operation.

8 Claims, 8 Drawing Sheets

(56)                    References Cited

U.S. PATENT DOCUMENTS 3,670,928 A  *   6/1972  Hanson ................... G01F 11/18
                                                                    222/308
6,799,413 B2 *  10/2004  Aylward ................. B65B 35/26
                                                                    53/244

FOREIGN PATENT DOCUMENTS

CN          106045286  A      10/2016
CN          107089489  A       8/2017
CN          208500771  U       2/2019
CN          208716439  U       4/2019
CN          111517098  A       8/2020
CN          212127984  U      12/2020
DE             254731  A1      3/1988
DE            3710694  A1     10/1988
KR        10-0849529  B1       8/2008

* cited by examiner

S711

S712

S713

S714

B $\dfrac{B}{1:3.3}$

DEVICE FOR SEPARATELY ARRANGING VACUUM GLASS SUPPORTS AND METHOD THEREOF

CROSS-REFERENCED APPLICATIONS

This application is a U.S. national phase entry under 35 U.S.C. § 371 from PCT International Application No. PCT/CN2021/079067 filed on Mar. 4, 2021, which is based upon and claims the benefit of priority from the prior Chinese Patent Application No. 202010284983.1 filed on Apr. 13, 2020. The entire contents of the above applications are incorporated herein by reference.

TECHNICAL FIELD

The present disclosure relates to the field of vacuum glass manufacturing equipment, in particular to a device and a method for separating granular supports.

BACKGROUND TECHNOLOGY

In the process of making vacuum glass, since there is a vacuum between the two pieces of glass, it is necessary to arrange supports in the vacuum layer to withstand the external atmospheric pressure. The particle size of the supports in the middle is in a range of 0.1 mm-0.5 mm. The separation method currently in use is to arrange the granules in sequence by a spiral vibrating disk, send the granules into the feed tube one by one through intermittent flow of compressed air, and then arrange the granules onto the surface of the glass. In the separation process, the force of the air flow may affect the accuracy of the separation, causing unwanted granules on the surface of the glass. Therefore, it is required to inspect the number of the supports on the surface of the glass, remove the unwanted supports, and perform an additional arrangement of supports, which increases the inspection cost, lengthens the production cycle, and reduces the production efficiency.

SUMMARY

An object of the present disclosure is to provide a device for separating vacuum glass supports, which is novel and unique in structure, convenient to use, and capable of obtaining individual supports. The specific technical solution is as follows:

A device for separating vacuum glass supports, including a base, a vibrator, a separation chamber assembly, a separation actuator, a feed tube, and a drive device. The drive device is provided at a side of the base and connected to the separation actuator, and the separation chamber assembly, the separation actuator, and the feed tube are sequentially provided from top to bottom at another side of the base. The vibrator is provided on the separation chamber assembly. The separation chamber assembly is provided with a feed inlet, an accommodation cavity, and a dispensing outlet, wherein the feed inlet is communicated with the accommodation cavity, the dispensing outlet is communicated with the feed tube, and the separation chamber assembly is inclinedly arranged with respect to a horizontal plane. The separation actuator passes through the separation chamber assembly and is provided at a lower portion of the accommodation cavity in a reciprocatingly movable manner. An upper edge of the separation actuator at a side close to the dispensing outlet is provided with a recess capable of accommodating one support. During reciprocating movements of the separator actuator, the accommodation cavity is communicated with the dispensing outlet via the recess of the separation actuator.

Further, the device for separating vacuum glass supports further includes a hopper and a limit baffle. The separation chamber assembly is disposed on a bottom plate inclined with respect to the horizontal plane through the limit baffle. The separation chamber assembly includes an upper separation chamber plate and a lower separation chamber plate disposed in parallel. The upper separation chamber plate is provided with the feed inlet. The lower separation chamber plate is provided with the dispensing outlet. The accommodation cavity is a convex accommodation cavity disposed on an end surface of the upper separation chamber plate away from the hopper and/or an end surface of the lower separation chamber plate close to the hopper. A convex portion at an upper end of the convex accommodation cavity is provided with the feed inlet communicated with the hopper, the lower portion of the convex accommodation cavity is provided with the dispensing outlet communicated with the recess of the separation actuator, and the separation actuator makes the reciprocating movements along the lower portion of the convex accommodation cavity.

Further, assuming that a thickness of the convex accommodation cavity is d, a thickness of the support is d1, and a maximum distance between any two points on a cross section of the support is d2, then d1<d<d2 and d<2d1.

Further, assuming that a height of the recess of the separation actuator is h, a width of the recess of the separation actuator is w, and a maximum distance between any two points on a cross section of the support is d2, then d2<h, d2<w, a difference between d2 and h is in a range of 0.01 mm-0.5 mm, and a difference between d2 and w is in a range of 0.01 mm-0.5 mm.

Further, the difference between d2 and h is in the range of 0.1 mm-0.2 mm and the difference between d2 and w is in the range of 0.1 mm-0.2 mm.

Further, the feed tube is a transparent tube, and a wall of the feed tube is provided with a sensor.

Further, assuming that an inner diameter of the feed tube is r and a maximum distance between any two points on a cross section of the support is d2, then r>d2 and a difference between r and d2 is in a range of 0.01 mm-0.5 mm.

Further, the difference between r and d2 is in the range of 0.1 mm-0.2 mm.

Further, a lower portion of the feed tube is further provided with a transition joint, wherein an inner cavity of the transition joint is provided with an inverted conical transition section and the inner cavity of the transition joint has a trumpet-shaped bottom.

Further, the sensor is an optical fiber sensor.

Further, the separation actuator is plate-shaped or rod-shaped.

Further, assuming that a thickness of the support is d1, a thickness of the separation actuator is d3, a width of the recess of the separation actuator is w, and a width of the separation actuator is w1, then d3>d1 and w<w1.

Further, an included angle between the separation chamber assembly and the horizontal plane is 5° to 75°.

Further, the included angle between the separation chamber assembly and the horizontal plane is 25° to 75°.

Further, a clearance is left between the limit baffle and the separation chamber assembly. Further, the separation chamber assembly is made of a wear-resistant and nonmagnetic material, wherein the upper separation chamber plate is provided with an observation window for observing the state of the support in the accommodation cavity and the situation of the transportation of the support by the separation actuator.

Further, a system for arranging vacuum glass supports, including a transmission section, a control system, and a plurality of the devices for separating vacuum glass supports according to any of the above. The transmission section includes a frame and a transmission roller table disposed on the frame and the frame is provided with a support beam. The separation devices are linearly arranged on the support beam at intervals and perform a support separation operation at the same time, so that the arrangement of the supports in one row in the vacuum glass is completed by one or more operations. Alternatively, the plurality of devices for separating vacuum glass supports according to any of the above are arranged on the support beam in an array and perform the support separation operation at the same time, so that the arrangement of the supports in one area is completed by one or more operations.

Further, the system for arranging vacuum glass supports further includes a movement control mechanism. The movement control mechanism is disposed on the frame and used to control the support beam to move along a glass conveying direction and/or a direction perpendicular to the glass conveying direction.

Further, a method for separating vacuum glass supports using the device for separating vacuum glass supports, including the following steps:

step I: starting a vibrator such that the supports in a hopper are sequentially and loosely arranged in one layer in an accommodation cavity through a feed inlet;

step II: starting a drive device to push a separation actuator such that any of the supports on a bottom layer in the accommodation cavity quickly and accurately enters the recess of the separation actuator under the action of the vibrator, and when a recess of the separation actuator overlaps with a dispensing outlet, stopping the drive device;

step III: after the support falls into a feed tube, if the sensor detects the passage of the support, completing the separation operation; and step IV: if the sensor does not detect the passage of the support, repeating step I to step III until the sensor detects the passage of the support, and completing the separation operation.

Further, a method for arranging vacuum glass supports using the system for arranging vacuum glass supports as described above, including the following steps:

step I: separating the supports by using the method for separating vacuum glass supports as described above;

step II: enabling the support beam to move step by step with respect to the glass; and step III: repeating step I and step II until a surface of the glass is covered with the supports and completing the arrangement operation.

When the device for separating vacuum glass supports according to the present disclosure is arranging supports, one reciprocating movement of the separation actuator can only transport one support, thereby eliminating the case in which multiple supports are arranged in one operation.

BRIEF DESCRIPTION OF THE DRAWINGS

FIG. 13($b$) is a schematic view of a support with a pentagonal cross section; FIG. 13($c$) is a schematic view of a support with a hexagonal cross section; FIG. 13($d$) is a schematic view of a support with a round cross section;

In the figures: 1, base; 2, cylinder mounting frame; 3, cylinder; 4, separation plate fixing block; 5, separation plate; 51, separation recess; 6, hopper; 7, separation chamber assembly; 71, upper separation chamber plate; 72, lower separation chamber plate; 8, feed tube; 9, optical fiber sensor; 10, feed tube clamp; 11, vibrator; 12, support; 13, limit baffle; 131, upper baffle; 132, lower baffle; and 14, bottom plate; 15, convex accommodation cavity; 16, feed inlet; 17, convex portion; 18, accommodation cavity; 19, separation actuator.

S1, transmission section; S11, transmission frame; S12, transmission power; S13, transmission roller table; S2, glass; S3, transverse movement bracket; S4, transverse movement control mechanism; S5, support beam; S6, separation device; S7, feed tube lifting mechanism; S71, blanking assembly; S711, feed tube; S712, guide sleeve; S713, compression spring; S714, transition joint; S72, guide assembly; S73, lifting power; and S74, fixing plate.

DETAILED DESCRIPTION

The present disclosure is described in more detail below with embodiments. The present disclosure may be embodied in many different forms and should not be construed as being limited to the exemplary embodiments set forth herein.

For ease of description, space-related terms, such as "up", "down", "left", and "right", may be used herein for describing a relationship between one element or feature and another element or feature as shown in the figures. It should be understood that, the space terms are intended to encompass different orientations of the device in use or operation other than the orientations described in the figures. For example, if the device in the figure is inverted, the element described as "below" other elements or features will be oriented "above" the other elements or features. Therefore, the exemplary term "below" may include both above and below. The device may be oriented in other ways (rotated by 90 degrees or in other orientations), and the spatially relative description used herein can be interpreted accordingly.

Figure 1:
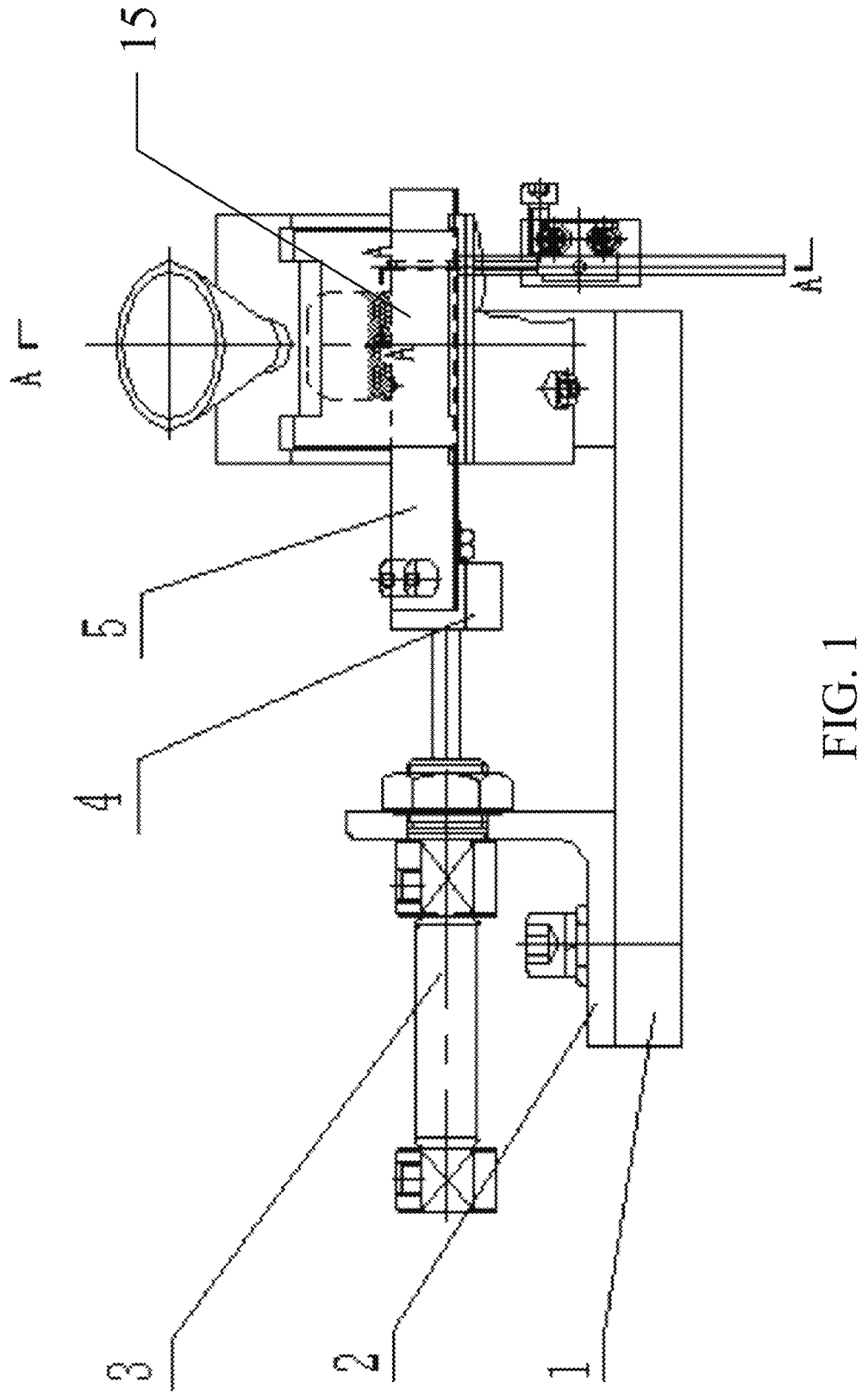
FIG. 1 is a schematic structural view of a device for separating vacuum glass supports according to the present disclosure.
Figure 2:
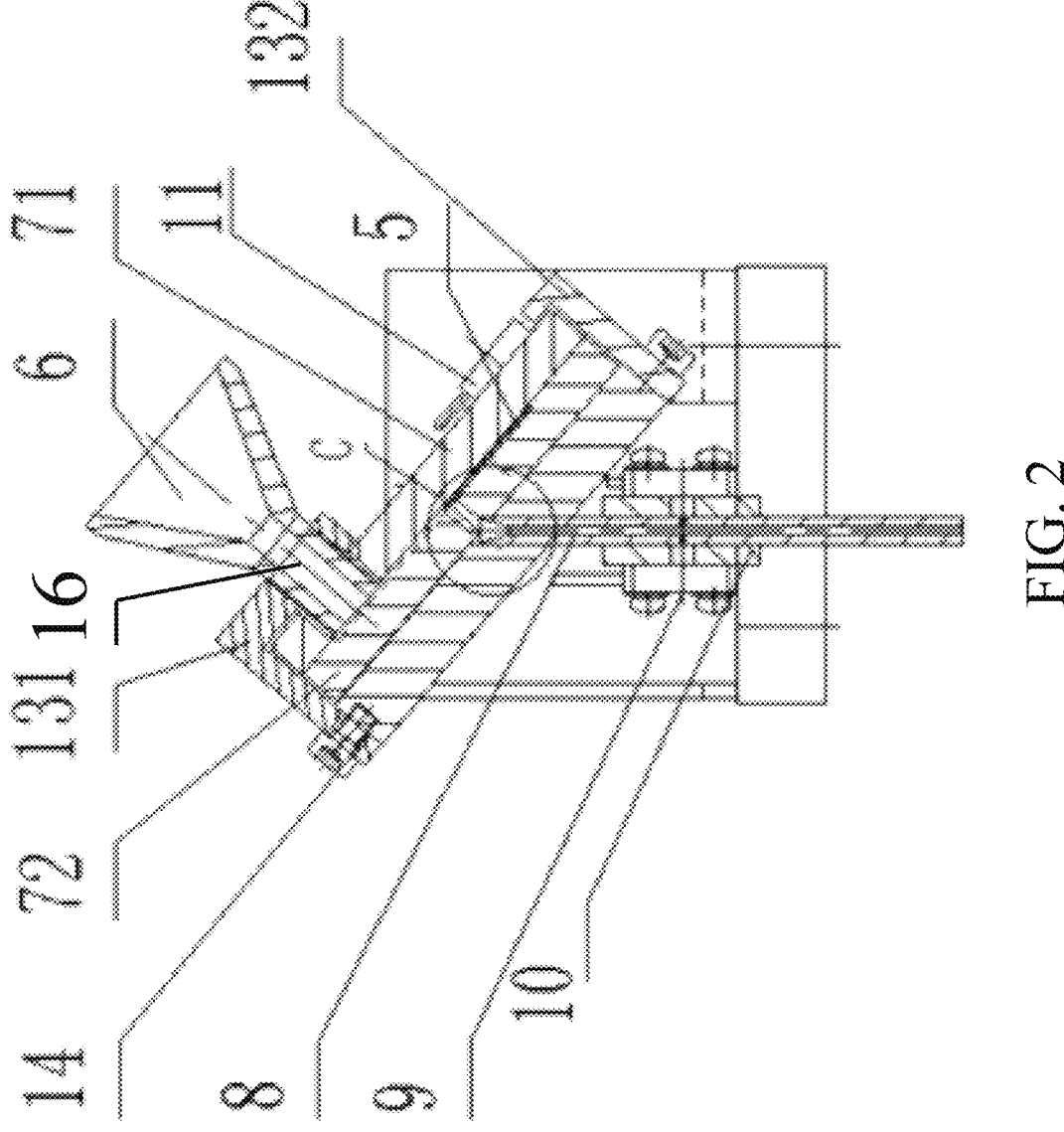
FIG. 2 is a sectional view of FIG. 1 taken along line A-A.
Figure 12:
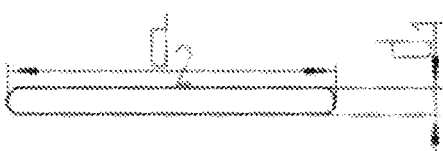
FIG. 12 is a schematic view of a side surface of the support.
Figure 13:
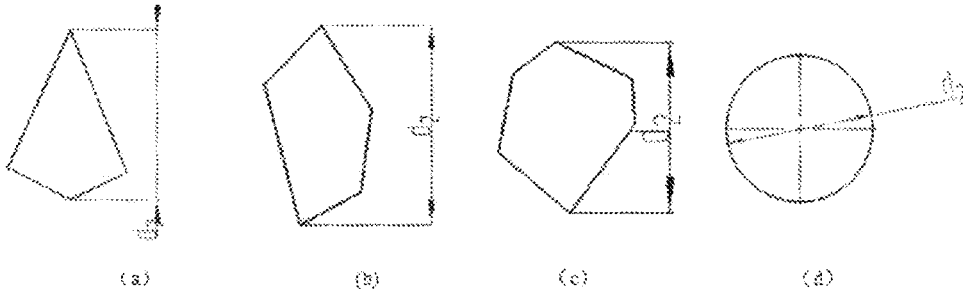
FIG. 13($a$) is a schematic view of a support with a quadrilateral cross section.
Figure 14:
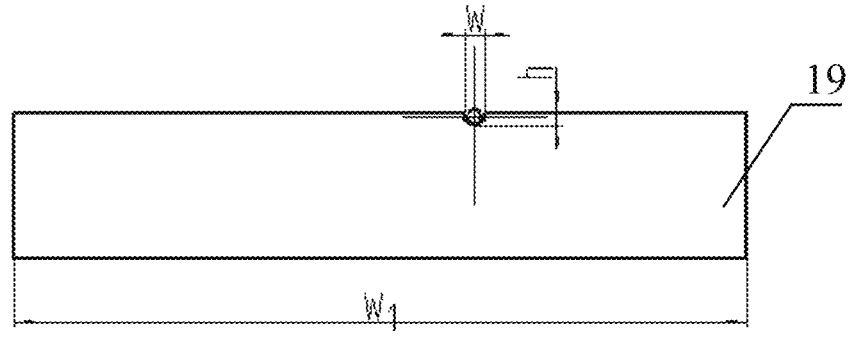
FIG. 14 is a front view of a separation actuator.
Figure 15:
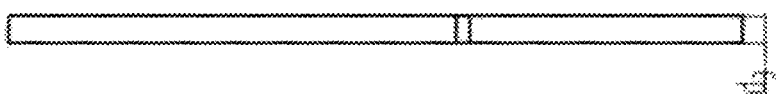
FIG. 15 is a side view of the separation actuator.

A support 12 may be in a round pie shape or in a pie shape with a polygonal cross section (as shown in FIG. 12 and FIG. 13). Here, a round pie-shaped object having a diameter of 0.5 mm-0.9 mm and a thickness of 0.2 mm-0.4 mm is taken as an example for description. As shown in FIG. 1 and FIG. 2, a device for separating vacuum glass supports in this embodiment includes a base 1, a hopper 6, a vibrator 11, a separation chamber assembly 7, a limit baffle 13, a separation plate 5, a feed tube 8, and a cylinder 3. The cylinder 3 is provided at a side of the base 1, and the hopper 6, the separation chamber assembly 7, the separation plate 5, and the feed tube 8 are sequentially provided from top to bottom at another side of the base 1. In order to avoid the blockage of the supports, the vibrator 11 is provided on the separation chamber assembly 7. Vibrations generated by the vibrator 11 drive the separation chamber assembly 7 to vibrate. The separation chamber assembly 7 is made of a wear-resistant and nonmagnetic material. The vibrations increase the fluidity of the granular supports, thereby ensuring the supports 12 to be arranged loosely. The separation chamber assembly 7 includes an upper separation chamber plate 71 and a lower separation chamber plate 72 disposed in parallel. The upper separation chamber plate 71 is provided with an observation window for observing the state of the support in the convex accommodation cavity 15 and the situation of the transportation of the support by the separation plate 5. The separation chamber assembly 7 is disposed on a bottom plate 14 inclined with respect to the horizontal plane. The limit baffle 13 is disposed outside the separation chamber assembly 7. A clearance is left between the limit baffle 13 and the separation chamber assembly 7, such that the separation chamber assembly 7 can vibrate. The upper separation chamber plate 71 is provided with a feed inlet 16 communicated with the hopper 6, and the lower separation chamber plate 72 is provided with a dispensing outlet communicated with the feed tube 8. The convex accommodation cavity 15 is disposed on an end surface of the upper separation chamber plate 71 away from the hopper 6 and/or an end surface of the lower separation chamber plate 72 close to the hopper 6. The separation plate 5 is movably provided at a lower portion of the convex accommodation cavity 15 and connected to the cylinder 3, which is driven by the cylinder 3 to make reciprocating movements along the lower portion of the ccommodation cavity 18. A convex portion 17 at an upper end of the convex accommodation cavity 15 is communicated with the hopper 6 via the feed inlet 16. An upper edge of the separation plate 5 at a side close to the convex portion 17 at the upper end of the convex accommodation cavity 15 is provided with a separation recess 51. On the plane where the separation plate 5 is located, the reciprocating movement direction is the width direction, the direction perpendicular to the reciprocating movement is the height direction, and the direction perpendicular to the plane where the separation plate 5 is located is the thickness direction. The separation plate 5 cooperates with a clearance fit with the lower portion of the convex accommodation cavity. The clearance should be less than a thickness d1 of the support 12, to prevent the support 12 from running out of the convex portion 17 at the upper end of the convex accommodation cavity 15 via the clearance during the reciprocating movements of the separation plate 5. A thickness d of the convex accommodation cavity 15 is greater than a thickness d1 of the support 12, and the thickness d of the convex accommodation cavity 15 is less than a cross-sectional diameter d2 of the support 12, so that the supports 12 can only be arranged with its bottom surface falling on the lower separation chamber plate 72 under the vibrations of the separation chamber assembly inclinedly arranged with respect to the horizontal plane. The thickness d of the convex accommodation cavity 15 is less than twice the thickness d1 of the support 12, which prevents the supports in the convex accommodation cavity 15 from being arranged in double layers. A width w of the separation recess 51 is less than a width w1 of the separation plate 5. A thickness d3 of the separation plate 5 is greater than the thickness d1 of the support 12. A height h of the separation recess 51 is greater than the cross-sectional diameter d2 of the support 12 by 0.1 mm-0.2 mm, and the width w of the separation recess 51 is greater than the cross-sectional diameter d2 of the support 12 by 0.1 mm-0.2 mm, so that the support 12 can smoothly enter the separation recess 51 and the separation recess 51 can only accommodate one support.

A drive mechanism is mounted on the base 1. The drive mechanism may be the cylinder 3. A cylinder block of the cylinder 3 is fixed to the base 1 via a cylinder mounting frame 2. A piston rod is fixedly connected to the separation plate 5 via a separation plate fixing block 4.

An upper baffle 131 and a lower baffle 132 are disposed outside the separation chamber assembly 7. The upper separation chamber plate 71, the lower separation chamber plate 72, and the bottom plate 14 are assembled together via the L-shaped upper baffle 131 and lower baffle 132. The bottom plate 14 is fixed to the base 1 inclinedly with respect to the horizontal plane.

The distance of the reciprocating movement of the separation plate 5 should be able to ensure that support 12 is conveyed into the dispensing outlet at a connecting channel between the lower separation chamber plate 72 and the feed tube 8 after the separation recess 51 obtains the support 12 from the convex accommodation cavity.

Figure 4:
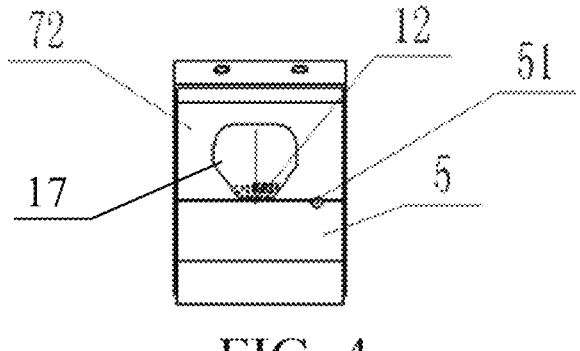
FIG. 4 is a schematic view of a convex accommodation cavity in which two sides of a convex portion at an upper end are set as slopes.
Figure 5:
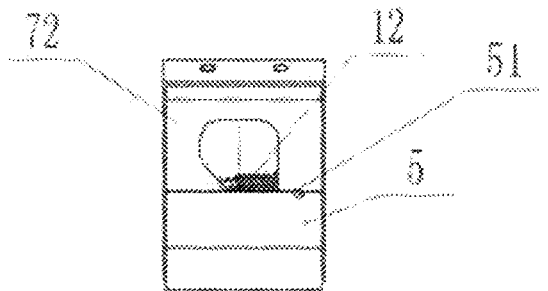
FIG. 5 is a schematic view of a convex accommodation cavity in which one side of a convex portion at an upper end is set as a slope.
Figure 6:
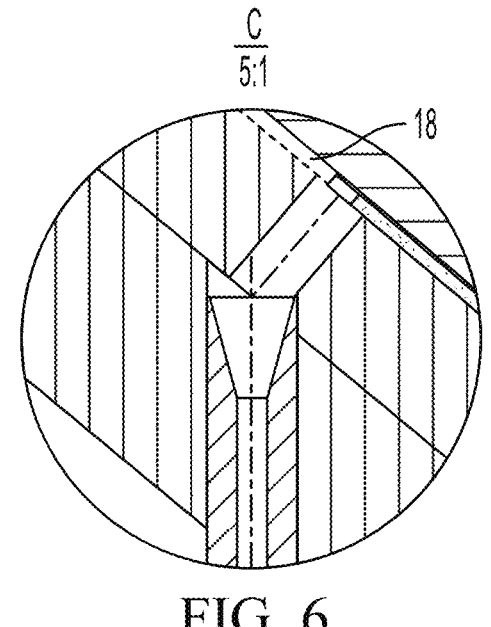
FIG. 6 is a partial enlarged view of Part C in FIG. 2.

As shown in FIG. 4 and FIG. 5, one or two sides of the convex portion 17 at the upper end of the convex accommodation cavity 15 may be provided with a slope or slopes, which is communicated with the separation plate 5 via a channel at the bottom of the slope and further reduces the advancing resistance of the separation plate carrying the support 12.

The separation actuator 19 is not limited to the plate-shaped separation actuator 19 in the figure and may also be a rod-shaped separation actuator 19. When the separation actuator 19 is a round rod, the end portion should be treated, for example perforated, to ensure that the recess is on the top surface during mounting.

Figure 3:
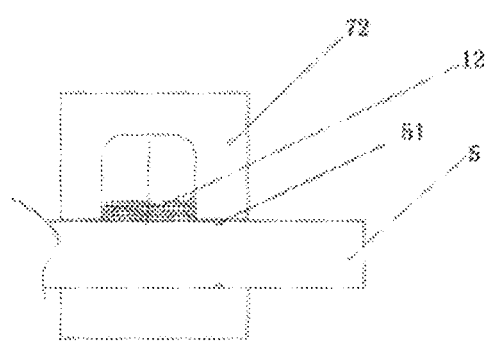
FIG. 3 is a schematic view showing a separation principle of the device for separating vacuum glass supports according to the present disclosure.

As shown in FIG. 3, a lower edge of the separation actuator 19 at a side away from the convex portion 17 at the upper end of the convex accommodation cavity 15 may also be provided with the separation recess 51 capable of accommodating one support. After the recess at the side of the separation plate 5 close to the convex portion at the upper end of the convex accommodation cavity 15 is worn, the separation plate may be turned over, which prolongs the service life of the separation actuator 19.

In order to detect the separation failure in time, the feed tube 8 is a transparent tube made of glass or other transparent materials, and a sensor is provided on a wall of the feed tube 8 to detect whether a support falls. The sensor is fixed to the feed tube 8 via a feed tube clamp 10.

The sensor is an optical fiber sensor 9, which has higher detection sensitivity. An included angle between the bottom plate 14 and the horizontal plane is 25° to 75°. In this way, the granular supports can be moved by gravity, and the supports can be prevented from excessively extruded by the gravity, which makes the pile of the supports easily loosened and ensures the smooth flow of the granular supports.

An inner diameter of the feed tube 8 is greater than a diameter of the support 12 by 0.1 mm-0.2 mm, so that the supports 12 can pass through smoothly.

In the embodiments, the separation plate 5 may be pushed to make the reciprocating movements by the cylinder 3 or an electric cylinder; or the separation plate 5 may be pushed to make the reciprocating movements by a crank-connecting rod mechanism driven by a stepping motor.

In the working process, the demagnetized supports 12 are added via the hopper 6 at the top. The vibrator is started such that the supports 12 are loosely arranged in one layer in a sequence of entering the convex accommodation cavity 15. The cylinder 3 is started to push the separation plate 5. Under the action of the vibrator, the support 12 falls into the separation recess 51 of the separation plate 5 at an end close to the convex portion 17 at the upper end of the convex accommodation cavity 15. The separation plate 5 moves rightward to convey the support 12 in the separation recess 51 to the dispensing outlet. The cylinder 3 stops driving, and the support 12 passes through the bottom plate 14 via the dispensing outlet, enters the feed tube 8, and is discharged via the bottom end of the feed tube 8. The cylinder 3 acts in the reverse direction and the separation plate 5 retracts, so that the separation recess 51 enters the convex portion 17 at the upper end of the convex accommodation cavity 15.

Figure 7:
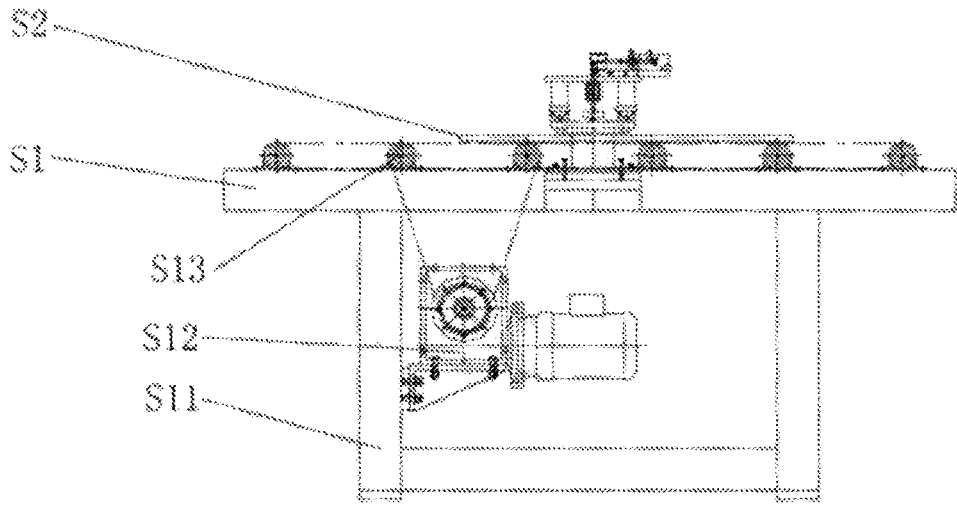
FIG. 7 is a schematic structural view of a system for arranging vacuum glass supports when viewed from the front.
Figure 8:
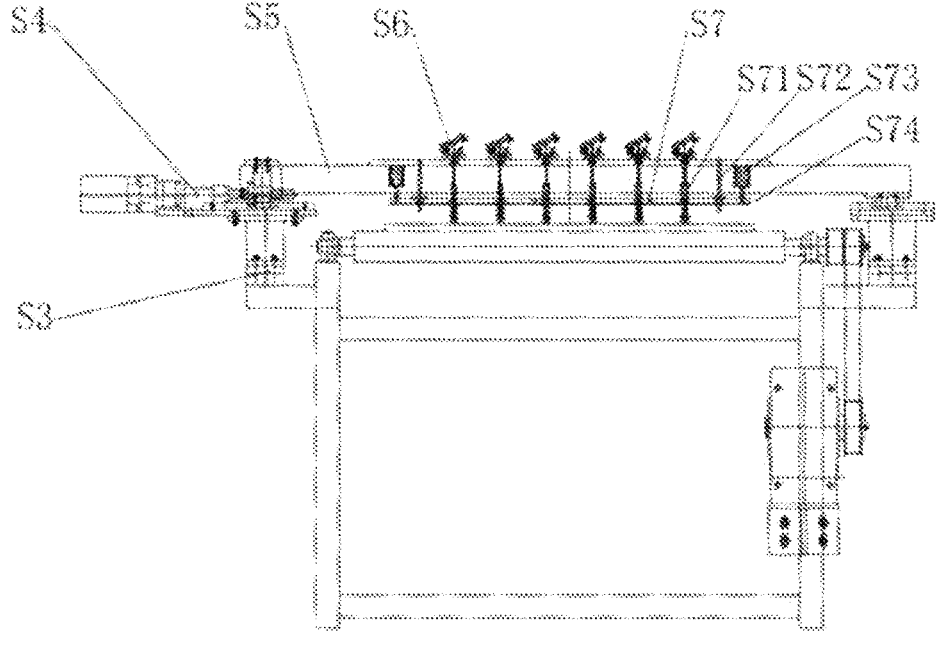
FIG. 8 is a schematic structural view of the system for arranging vacuum glass supports when viewed from the left.
Figure 9:
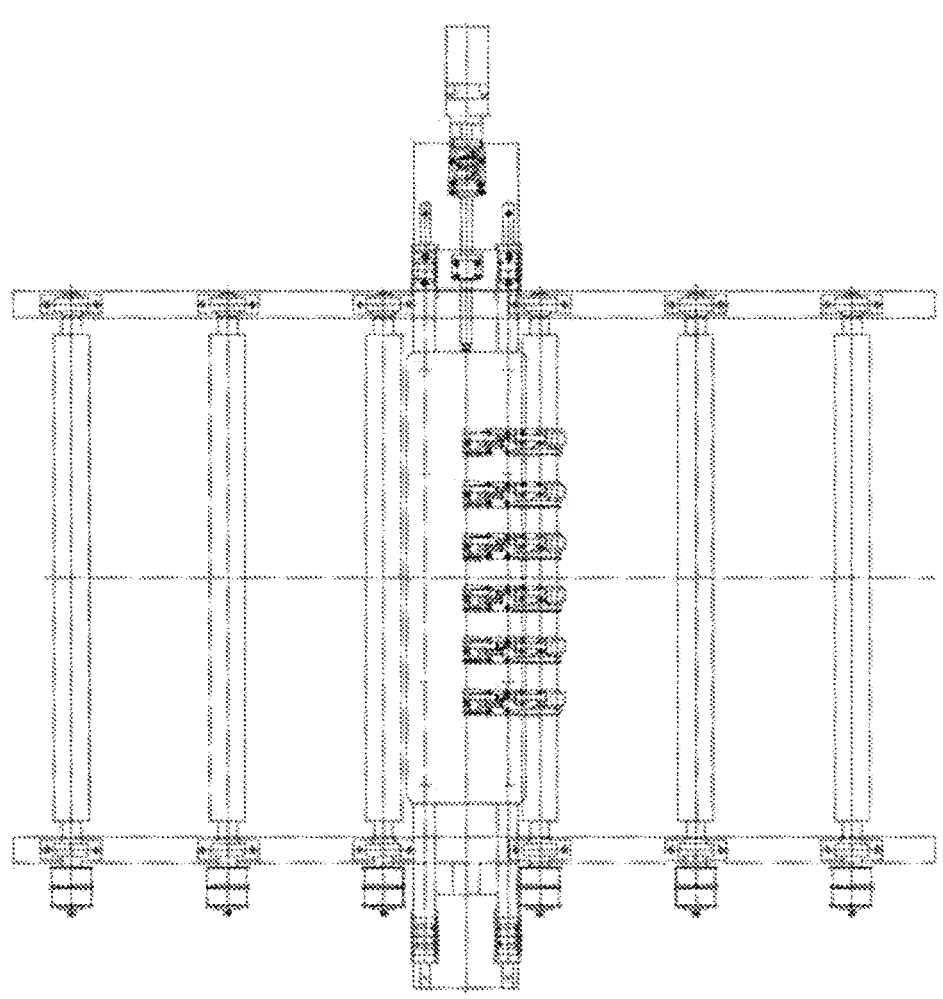
FIG. 9 is a schematic structural view of the system for arranging vacuum glass supports when viewed from the top.

The glass conveying direction is set as the longitudinal direction, and the direction perpendicular to the glass conveying direction is set as the transverse direction. As shown in FIG. 7 to FIG. 9, a system for arranging vacuum glass supports in this embodiment includes a transmission section S1, a control system (not shown), and a separation devices S6. The transmission section S1 includes a transmission frame S11 and a transmission roller table S13 on the transmission frame S11. Transmission power S12 provides a driving force for the transmission roller table S13. Generally, the motor drives the transmission roller table S13 via a belt or a sprocket after a speed reducer. When a servo motor is used, the speed reducer may also be omitted. The control system is a PLC control system located in an electrical control cabinet of a vacuum glass production line. The PLC control system is electrically connected to a transmission power S12 device of the transmission roller table S13 and the separation device S6, which controls the rotation of the transmission roller table S13 and the separation and arrangement of the support 12. Glass S2 is placed on the transmission roller table S13 and is capable of moving back and forth along the transmission roller table S13. The top surface of the transmission frame S11 and the left and right sides of the transmission roller table S13 are respectively provided with a transverse movement bracket S3, and a support beam S5 is disposed over the transverse movement bracket S3. One end of the support beam S5 is further provided with a transverse movement control mechanism S4, so that the separation device S6 can move transversely along the support beam S5. The transverse movement bracket S3 is disposed horizontally. In the figure, the transverse movement bracket S3 is disposed in a direction perpendicular to the movement direction of the glass S2. The transverse movement bracket S3 may also be disposed inclinedly at an angle of 45 degrees, 30 degrees, etc. with the movement direction of the glass S2. The separation device S6 is disposed on the support beam S5 via the base 1. There may be one or more separation devices S6. In this embodiment, there are six separation devices S6. The separation devices S6 are linearly arranged on the support beam S5 at intervals.

In other embodiments of the present disclosure, the separation devices may be arranged on the support beam S5 at intervals in an array.

In order to arrange the supports 12, the system is further provided with a feed tube lifting mechanism S7. When the system is arranging the supports, a blanking assembly S71 descends, the separation devices S6 separate the supports 12, the support 12 falls off from the feed tube 8, and the optical fiber sensor 9 detects the passage of the support. The support stops on the surface of the glass S2 via the blanking assembly S71. When the optical fiber sensor 9 of one or more of the separation devices S6 does not detect the passage of the support, the PLC control system controls the corresponding separation device S6 to execute the separation operation again until the optical fiber sensor 9 detects the passage of the support. Then, the blanking assembly S71 ascends, which prevents the support 12 from colliding with the lower end of the blanking assembly S71 when the glass S2 moves forward. After the blanking assembly S71 ascends to the appropriate position, the transmission roller table S13 rotates to drive the glass S2 to move forward by one step and then the support 12 is placed again, thereby forming an array of the supports on the surface of the glass S2. In other embodiments of the present disclosure, the glass may be kept still. The movement control mechanism includes a transverse movement control mechanism S4 and a longitudinal movement control mechanism, wherein the longitudinal movement control mechanism controls the longitudinal step-by-step movement of the support beam S5. The longitudinal movement control mechanism is electrically connected to the PLC control system. After the blanking assembly S71 ascends to the appropriate position, the longitudinal movement control mechanism drives the support beam S5 to move by one step and then the support 12 is arranged again, thereby forming an array of the supports on the surface of the glass S2.

Figure 10:
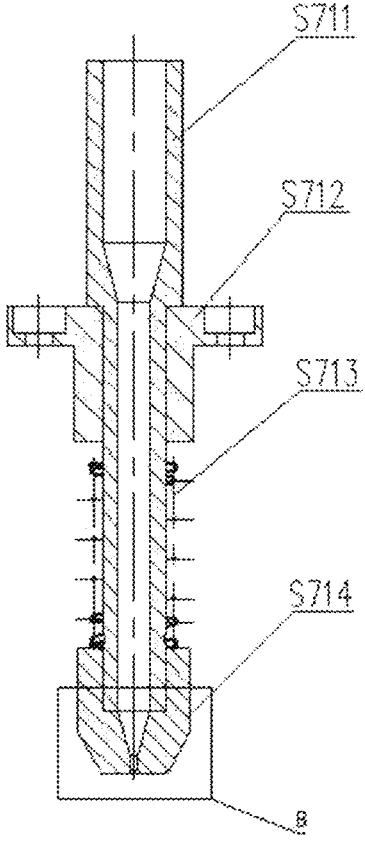
FIG. 10 is a schematic structural view of a blanking assembly.

As shown in FIG. 10, the blanking assembly S71 includes a feed tube S711, a guide sleeve S712, a compression spring S713, and a transition joint S714. The feed tube 8 of the separation device S6 is inserted into a material through hole at the center of the feed tube S711, and a clearance is provided between an outer wall of the feed tube 8 and an inner wall of the material through hole. An upper end of the feed tube S711 is provided with a stepped surface. The stepped surface has a larger outer diameter at the upper end and a smaller outer diameter at the lower end. The guide sleeve S712 is sleeved on a smaller end of the feed tube S711, and the compression spring S713 and the transition joint S714 are sequentially arranged below the guide sleeve. The transition joint S714 is fixed to the lower end of the feed tube S711 by a thread, a snap-in hole, or a pin. The guide sleeve S712 and the transition joint S714 clamp the compression spring S713 in a compressed state. The guide sleeve S712 is fixed to a fixing plate S74. When the fixing plate S74 descends, the compression spring S713 pushes the transition joint S714, so that a lower end surface of the transition joint S714 is in close contact with the surface of the glass S2. When the fixing plate S74 ascends, the guide sleeve S712 drives the feed tube S711 to ascend via the stepped surface.

The support beam S5 is further provided with a feed tube lifting mechanism S7. The feed tube lifting mechanism S7 includes a guide assembly S72, lifting power S73, and a fixing plate S74. The guide assembly S72 is composed of a guide sleeve and a guide rod. The lifting power S73 is provided by an electric cylinder or a cylinder. The lifting power S73 drives the fixing plate S74 to move up and down.

Figure 11:
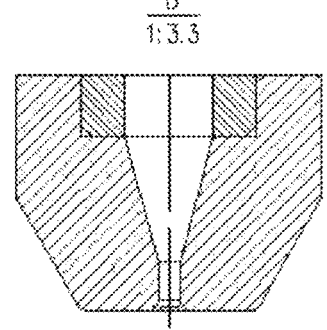
FIG. 11 is a partial enlarged view of Part B in FIG. 10.

As shown in FIG. 11, an inner cavity of the transition joint S714 is provided with an inverted conical transition section, and the inner cavity of the transition joint S714 has a trumpet-shaped bottom, so that the supports 12 can be accurately located on the glass S2 after being sorted via the transition section, which prevents the support from bouncing off its proper position or bouncing off the glass S2.

Beneficial Effects

1. The convex accommodation cavity forms an included angle with the horizontal direction, so that the supports can be automatically arranged in sequence in one layer when being added.
2. Under the action of the vibrations, a clearance between supports is formed in the separation process, and thus the support can quickly and accurately enter the recess of the separation plate, which increases the success rate of separation of the supports.
3. The thickness of the support is less than the thickness of the separation plate, so that a small clearance is left between the support and the convex accommodation cavity in the separation process, which reduces wear.
4. When the system is arranging the supports, one reciprocating movement of the separation plate can only transport one support, thereby eliminating the case in which multiple supports are arranged in one operation.
5. With the optical fiber sensor added to detect the passage of the support, when there is no support falling off, the separation operation is restarted until the optical fiber sensor detects the passage of the support, so that every recess can accommodate one support after the separation operation.

The foregoing examples are only intended to illustrate the present disclosure. In addition, there are a number of different embodiments that will be conceivable to a person skilled in the art upon understanding the ideas of the present disclosure, and examples are not listed herein.

What is claimed is:
1. A device for separating vacuum glass supports, comprising:
   a base;
   a vibrator;
   a separation chamber assembly;
   a separation actuator;
   a feed tube; and
   a drive device;
   wherein the drive device is provided at a side of the base and connected to the separation actuator, and the separation chamber assembly, the separation actuator, and the feed tube are sequentially provided from top to bottom at another side of the base;
   wherein the vibrator is provided on the separation chamber assembly;
   wherein the separation chamber assembly is provided with a feed inlet, an accommodation cavity and a dispensing outlet, wherein the feed inlet is communicated with the accommodation cavity, the dispensing outlet is communicated with the feed tube, and the separation chamber assembly is inclinedly arranged with respect to a horizontal plane;
   wherein the separation actuator passes through the separation chamber assembly and is provided at a lower portion of the accommodation cavity in a reciprocatingly movable manner;

wherein an upper edge of the separation actuator at a side close to the dispensing outlet is provided with a recess capable of accommodating one support;
   wherein the accommodation cavity is communicated with the dispensing outlet via the recess of the separation actuator during reciprocating movements of the separator actuator;
   wherein the separation chamber assembly is disposed on a bottom plate inclined with respect to the horizontal plane;
   wherein the separation chamber assembly comprises an upper separation chamber plate and a lower separation chamber plate disposed in parallel, wherein the upper separation chamber plate is provided with the feed inlet and the lower separation chamber plate is provided with the dispensing outlet,
   wherein the device is part of a plurality of devices for separating vacuum glass supports that are connected to a transmission section that comprises a frame and a transmission roller table disposed on the frame and the frame is provided with a support beam; and
   wherein the plurality of devices are linearly arranged on the support beam at intervals and perform a support separation operation at the same time, so that an arrangement of the supports in one row in a vacuum glass is completed by one or more operations; or
   wherein the plurality of devices are arranged on the support beam in an array and perform the support separation operation at the same time, so that the arrangement of the supports in one area in a vacuum glass is completed by one or more operations.

2. The device for separating vacuum glass supports according to claim 1, further comprising:
   a hopper, wherein a convex portion at an upper end of the accommodation cavity is provided with the feed inlet communicated with the hopper, the lower portion of the accommodation cavity is provided with the dispensing outlet communicated with the recess of the separation actuator, and the separation actuator makes the reciprocating movements along the lower portion of the accommodation cavity.

3. The device for separating vacuum glass supports according to claim 2, wherein a thickness of the accommodation cavity is d, a thickness of the support is d1, and a maximum distance between any two points on a cross section of the support is d2, and wherein $d1<d<d2$ and $d<2d1$.

4. The device for separating vacuum glass supports according to claim 1, wherein a height of the recess of the separation actuator is h, a width of the recess of the separation actuator is w, and a maximum distance between any two points on a cross section of the support is d2, and wherein $d2<h$, $d2<w$, a difference between d2 and h is in a range of 0.01 mm-0.5 mm, and a difference between d2 and w is in a range of 0.01 mm-0.5 mm.

5. The device for separating vacuum glass supports according to claim 4, wherein the difference between d2 and h is in a range of 0.1 mm-0.2 mm and the difference between d2 and w is in a range of 0.1 mm-0.2 mm.

6. The device for separating vacuum glass supports according to claim 1, wherein the feed tube is a transparent tube and a wall of the feed tube is provided with a sensor.

7. The device for separating vacuum glass supports according to claim 1, wherein an inner diameter of the feed tube is r and a maximum distance between any two points on a cross section of the support is d2, and wherein r>d2 and a difference between r and d2 is in a range of 0.01 mm-0.5 mm.

8. A method for separating vacuum glass supports using the device for separating vacuum glass supports according to claim 1, comprising:

step I: starting the vibrator of the device such that the supports are sequentially and loosely arranged in one layer in the accommodation cavity of the device;

step II: starting the drive device of the device to push the separation actuator of the device such that any of the supports on a bottom layer in the accommodation cavity quickly and accurately enters the recess of the separation actuator under actions of the vibrator;

step III: stopping the drive device when the recess of the separation actuator overlaps with the dispensing outlet of the device;

step IV: completing a separation operation if a sensor attached to a feed tube of the device detects a passage of the support; and step V: repeating step I to step III if the sensor does not detect the passage of the support and completing the separation operation until the sensor detects the passage of the support.

\* \* \* \* \*